UNITED STATES PATENT OFFICE.

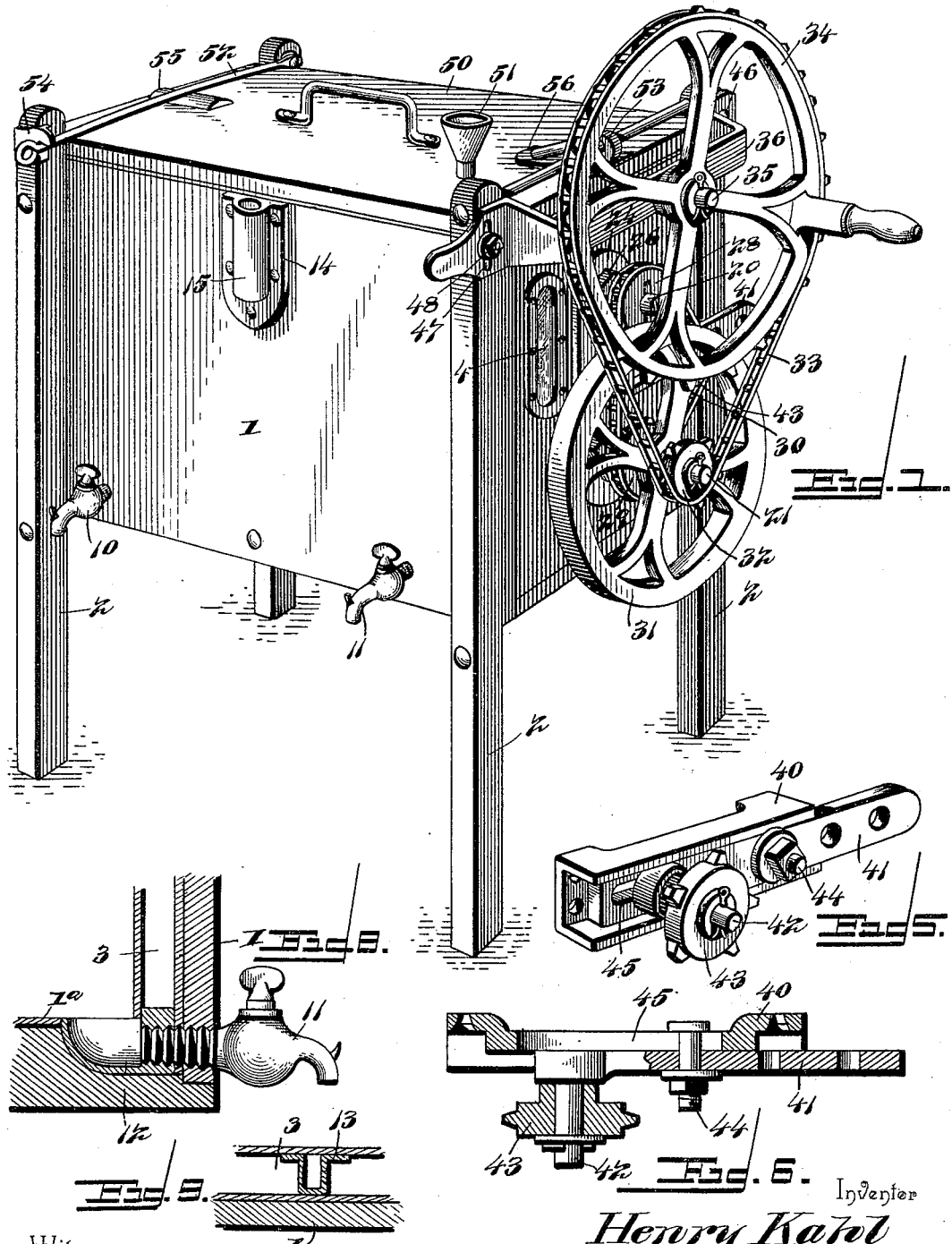

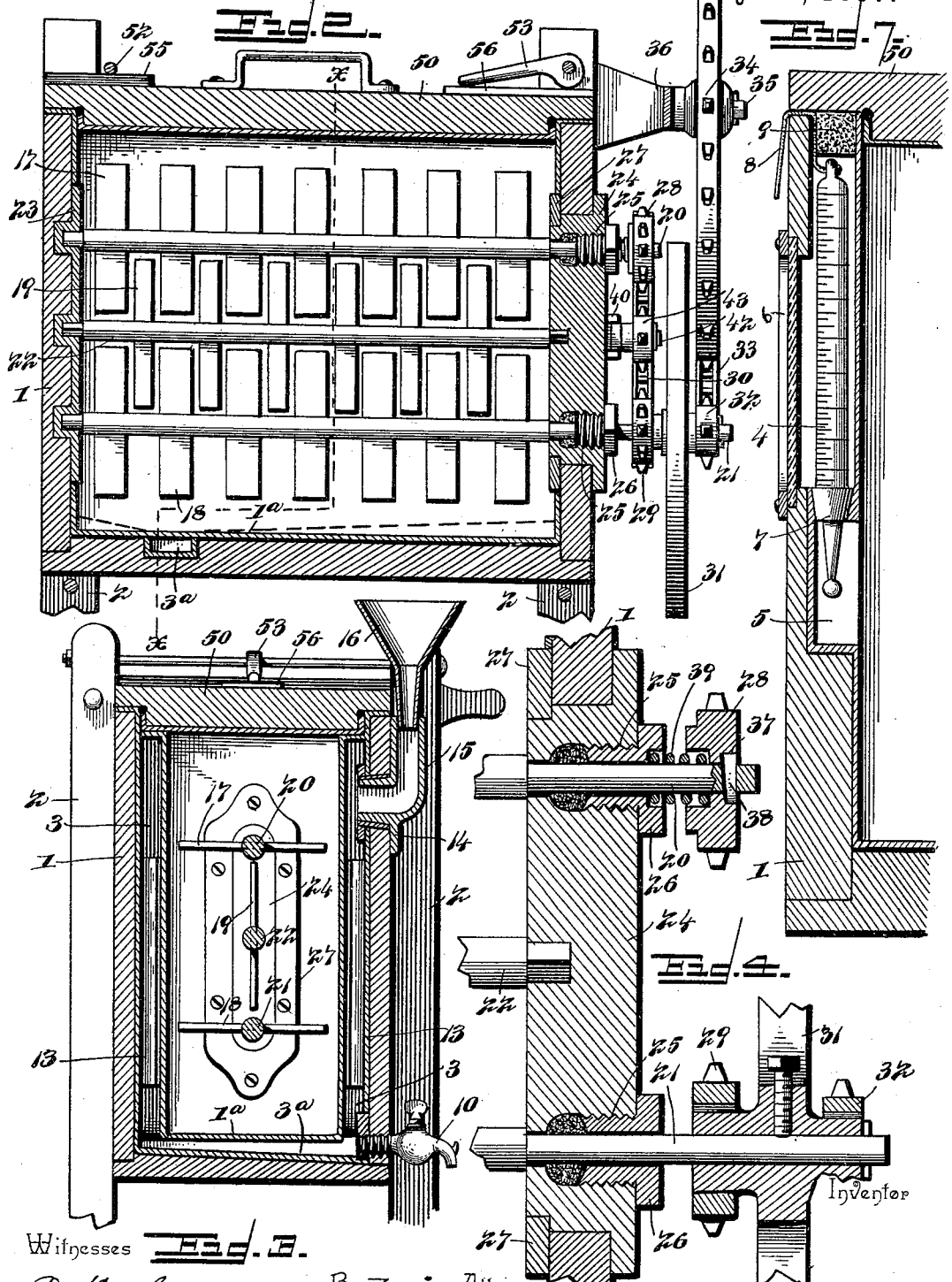

HENRY KAHL, OF IHLEN, MINNESOTA.

CHURN.

SPECIFICATION forming part of Letters Patent No. 583,232, dated May 25, 1897.

Application filed December 22, 1896. Serial No. 616,615. (No model.)

*To all whom it may concern:*

Be it known that I, HENRY KAHL, a citizen of the United States, residing at Ihlen, in the county of Pipestone and State of Minnesota, have invented a new and useful Churn, of which the following is a specification.

The invention relates to improvements in churns.

The object of the present invention is to improve the construction of churns and to provide a simple and comparatively inexpensive one adapted for churning sweet milk and capable of extracting a maximum quantity and quality of butter from a given quantity of sweet milk in a minimum amount of time.

A further object of the invention is to provide a churn which will enable its contents to be readily maintained at the proper temperature for churning and which will operate as an effective washer for butter.

The invention consists in the construction and novel combination and arrangement of parts hereinafter fully described, illustrated in the accompanying drawings, and pointed out in the claims hereto appended.

In the drawings, Figure 1 is a perspective view of a churn constructed in accordance with this invention. Fig. 2 is a longitudinal sectional view. Fig. 3 is a transverse sectional view on line $x\ x$ of Fig. 2. Fig. 4 is an enlarged detail sectional view illustrating the construction of the outer bearings of the horizontal shafts. Fig. 5 is a perspective view of the chain-tightener. Fig. 6 is a sectional view of the same. Fig. 7 is a vertical sectional view illustrating the manner of mounting the thermometer. Fig. 8 is a detail sectional view illustrating the manner of mounting the faucet for drawing off the contents of the churn-body. Fig. 9 is a detail sectional view illustrating the construction of the braces of the reservoir.

Like numerals of reference designate corresponding parts in all the figures of the drawings.

1 designates a churn-body, rectangular in cross-section, supported by legs 2 and provided with an interior reservoir 3, arranged at the inner faces of its sides and consisting of inner and outer walls of sheet metal. The two sides or portions of the reservoir are connected by a transverse tube or passage $3^a$, located beneath the bottom lining $1^a$ of the churn-body and having a slight inclination, as illustrated in Fig. 3 of the accompanying drawings.

The tube or passage $3^a$, which is preferably rectangular in cross-section, as shown in Fig. 2, is located adjacent to one end of the churn-body, and the bottoms of the sections of the reservoir are oppositely inclined to cause their entire contents to drain into the transverse tube or passage $3^a$.

The reservoir is adapted to receive hot water in winter and cold water in summer in order to maintain the contents of the churn-body at the proper temperature for churning. A thermometer 4 is mounted at the front end of the churn-body in convenient position to be seen by the operator. It is disposed vertically in an opening of the said end of the churn-body and its lower end projects into a recess 5 at the inner face of the front end to expose the bulb of the thermometer to the contents of the churn-body. A recess is provided at the outer face of the front end of the churn-body and is covered by a transparent plate 6, of glass or other suitable material, which enables the thermometer to be readily examined. The transparent plate is arranged in a suitable frame, and a gasket 7 is arranged around the lower portion of the thermometer to prevent the contents of the churn-body from entering the recess covered by the transparent plate. A cord 8 is attached to the upper end of the thermometer to facilitate the withdrawal of the same, and a plug 9, of cork or other suitable material, is fitted in the upper end of the thermometer-opening and engages the said cork.

The contents of the reservoir and the churn-body are drawn off, after the operation of churning has been completed, through faucets 10 and 11, communicating, respectively, with the interior of the reservoir and the churn-body. The faucet 10 is mounted in a threaded opening at the lower end of the transverse tube or passage $3^a$ and is provided with a suitable gasket, and the other faucet screws into a threaded opening of a substantially semicylindrical casting 12, which is arranged at the bottom of the churn-body and forms a gutter or depression in the same to facilitate the flow of the contents of the churn through the faucet 11. The bottom of the churn-body has a slight inclination to direct the contents of the churn-body into the gutter or depression of the casting 12.

The inner wall of the reservoir is supported by braces 13, constructed of sheet metal and consisting of strips folded longitudinally to provide a substantially U-shaped body and having their longitudinal edges bent outward to provide side flanges which bear against the inner walls of the sections of the reservoir.

Water is introduced into the reservoir at the top thereof through an opening provided in a plate 14, and the latter is secured to the outer face of one of the sides of the churn-body and is provided with a vertical tubular portion 15, open at its top to receive the tubular portion of a funnel 16 and provided at its bottom with an opening communicating with the interior of the reservoir.

The production of butter is effected by means of upper and lower rotary dashers 17 and 18 and a central stationary dasher or breaker 19. The upper and lower dashers consist of horizontal longitudinally-disposed shafts 20 and 21 and wide transverse paddles or blades arranged at intervals and centrally secured to the shafts 20 and 21 in slots or openings thereof. The central stationary dasher or breaker consists of a horizontal rod or shaft 22 and a series of narrow vertically-disposed blades or paddles secured to the rod or shaft 22 similar to the paddles of the upper and lower rotary dashers and arranged opposite the intervals between the blades or paddles of the upper and lower dashers.

The inner ends of the horizontal shafts 20 and 21 are journaled in bearing-openings of an inner bearing-plate 23, secured to the inner face of the rear end of the churn-body, and the outer ends of the shafts 20 and 21 are arranged in bearing-openings of an exterior bearing-plate 24, secured to the outer face of the front end of the churn-body. The bearing-openings 25 of the bearing-plate 24 are interiorly threaded and have rounded inner portions and form packing-boxes. The packing within the boxes 25 is engaged by nuts 26, which screw into the threaded packing-boxes and which force the packing tightly against the shafts.

A plate 27, which is secured to the inner face of the front end of the churn-body, serves as a gasket to effectually prevent milk from percolating between the front bearing-plate and the front wall of the churn-body and getting behind the lining of the latter.

The upper and lower shafts 20 and 21 are extended beyond the front of the churn-body and carry sprocket-pinions 28 and 29, which are connected by a sprocket-chain 30. The lower sprocket-wheel 29 is connected with a balance-wheel 31 and is arranged at the inner face thereof, and an outer sprocket-pinion 32 is keyed to the hub of the balance-wheel and is connected by a sprocket-chain 33 with a master-wheel 34. The master-wheel 34 is provided with a crank-handle and is journaled on a stub-shaft 35 of a bearing-bracket 36, and the gearing enables the upper and lower dashers to be rotated at a sufficient speed to produce the necessary agitation of the contents of the churn-body to effect a rapid production of butter.

The upper sprocket-pinion 28 is provided in its outer face with recesses 37, receiving a projecting key 38 of the upper shaft, and the sprocket-pinion 28 is held in engagement with the said key by means of a coiled spring 39, arranged on the upper shaft and interposed between the adjacent nut 26 and the said sprocket-pinion 28.

The chain 30 is maintained at the proper tension by a tightening device comprising a bracket-plate 40, arranged horizontally, and a slide 41, arranged on the plate 40 and provided with a stub-shaft or journal 42, receiving a sprocket-pinion 43, which engages one side or flight of the chain 30. The bracket-plate 40 is provided at opposite sides with flanges, forming a guide, and the slide 41 is provided with a series of perforations and carries a bolt 44, which engages a longitudinal slot 45 of the guide-plate. The ends of the bracket or guide 40 are angularly bent to offset the body portion thereof from the churn-body, and a space is thereby provided for the reception of the head of the bolt 44. By this construction the slide may be arranged at any desired adjustment to tighten the chain 30 to the desired tension.

The bearing-bracket 36 has its ends angularly bent to offset the central portion, and one end 46 of the bearing-bracket is pivoted to the churn-body, and its other end is provided with a handle and has a vertical slot 47, receiving a fastening device 48, consisting, preferably, of a bolt and clamping the bearing-bracket at the desired adjustment. The bearing-bracket is adapted to be raised to tighten the sprocket-chain of the master-wheel to the desired extent.

The cover 50 of the churn-body is provided with a suitable packing to make a tight joint. It has a central handle, and it is provided with a funnel-shaped vent 51 to permit the escape of the gases. The tubular portion of the funnel-shaped vent 51 is arranged in a perforation of the cover, and the bowl or upper portion of the vent will permit any of the contents of the churn-body to drain back readily should any of the milk be thrown upward through the vent.

One end of the cover of the churn-body is secured by a transverse rod 52, and the other end is engaged by a cam-lever 53, and the rod 52 is pivoted at one end to the churn-body at one side thereof, and its other end interlocks with a hook-shaped projection of a plate 54 and engages a round plate 55 of the cover. The cam-lever 53 is fulcrumed in a stationary transverse rod and engages a plate 56 of the cover.

It will be seen that the churn is simple and comparatively inexpensive in construction, that it is adapted to maintain its contents at the proper temperature for churning, and that it is capable of rapidly producing butter. It will also be apparent that the dashers will serve as effective washers for butter and for cleaning the churn, and that the contents of the churn-body and the reservoir may be readily drawn off when desired.

Changes in the form, proportion, and minor details of construction may be resorted to without departing from the principle or sacrificing any of the advantages of the invention.

What I claim is—

1. In a churn, the combination of a churn-body provided at the inner faces of its sides with reservoirs forming an interior lining and having inclined bottoms, a transverse tube or passage 3ª connecting the reservoirs and disposed at an inclination, the braces 13 arranged within the reservoirs, supporting the same and consisting of strips folded longitudinally to provide a substantially U-shaped body and having their longitudinal edges bent outward to form side flanges, faucets communicating with the reservoirs and the interior of the churn-body, and the casting 12 having a threaded opening to receive one of the faucets and provided with a substantially semi-cylindrical portion having its upper edges flush with the bottom of the churn-body and forming a gutter, substantially as described.

2. In a churn, the combination of a churn-body, upper and lower horizontal shafts extending longitudinally of the churn-body, the upper shaft being provided with a projection, transverse blades or paddles centrally secured to the upper and lower shafts and arranged at intervals, a centrally-arranged dasher or beater located between the upper and lower shafts and provided with stationary blades or paddles, a sprocket-pinion mounted on the upper shaft and provided with a recess receiving the said projection whereby the pinion is interlocked with the upper shaft, a spiral spring disposed on the upper shaft and holding the sprocket-pinion normally in engagement with the projection, a sprocket-pinion mounted on the lower shaft, a sprocket-chain connecting the sprocket-pinions, and gearing for rotating the lower shaft, substantially as described.

3. In a churn, the combination of a churn-body, upper and lower horizontal dashers provided with longitudinal shafts, a sprocket-pinion mounted on the upper shaft, a balance-wheel fixed to the lower shaft and provided with inner and outer sprocket-pinions, a sprocket-chain connecting the sprocket-pinion of the upper shaft and the inner sprocket-pinion of the balance-wheel, and an adjustable bearing-bracket mounted on the churn-body, a master-wheel journaled on the bearing-bracket, and a sprocket-chain connecting the outer pinion of the balance-wheel and the master-wheel, substantially as described.

4. In a churn, the combination of a churn-body, upper and lower rotary dashers having horizontal shafts, gearing connecting the shafts, a sprocket-pinion mounted on the lower shaft, a bearing-bracket pivoted at one end of the churn-body and having its other end adjustably secured to the same, a master-wheel mounted on the bearing-bracket, and a sprocket-chain arranged on the sprocket-pinion and the master-wheel and adapted to be tightened by the adjustment of the bearing-bracket, substantially as described.

In testimony that I claim the foregoing as my own I have hereto affixed my signature in the presence of two witnesses.

HENRY KAHL.

Witnesses:
J. H. TAYLOR,
T. E. NASH.